United States Patent
Hu

Patent Number: 5,565,618
Date of Patent: Oct. 15, 1996

[54] METHOD TO SPECIFY SINUSOIDAL VIBRATION TESTS FOR PRODUCT DURABILITY VALIDATION

[75] Inventor: Jun M. Hu, Canton, Mich.

[73] Assignee: Ford Motor Company, Dearborn, Mich.

[21] Appl. No.: 566,242

[22] Filed: Dec. 1, 1995

[51] Int. Cl.$^6$ ..................................................... G01M 7/00
[52] U.S. Cl. ............................................... 73/1 R; 73/662
[58] Field of Search ............................. 73/1 R, 662, 808, 73/811, 865.8, 866.4; 364/508

[56] References Cited

U.S. PATENT DOCUMENTS

| | | |
|---|---|---|
| 3,710,082 | 1/1973 | Sloane et al. |
| 5,012,428 | 4/1991 | Ueno et al. |
| 5,065,618 | 11/1991 | Hodges, Sr. et al. ............. 73/105 |
| 5,179,860 | 1/1993 | Tsuboi. |
| 5,291,419 | 3/1994 | Satoh et al. |
| 5,299,459 | 4/1994 | Underwood. |

Primary Examiner—Robert Raevis
Attorney, Agent, or Firm—Richard D. Dixon

[57] ABSTRACT

A method for determining the testing profile for accelerated laboratory sinusoidal vibrational testing of a product, includes the steps of (i) selecting the type and rate for the frequency sweep, (ii) developing a simplified composite Power Spectral Density function $PSD_j$ representing expected field vibration levels, (iii) developing the acceleration force function $G_T(f)$ corresponding to the PSD function, (iv) determining the stress response curve $H(f)$ for the product, (v) selecting the number of frequency sweeps $N_w$ based on the testing equipment, the testing time available, and the range of acceleration forces required for implementing $G_T(f)$ from the relationship $$G_u = \left\{ \frac{11.1x(\sqrt{2})^m \, \Gamma\left(\frac{m}{2} + 1\right) \Sigma_i \frac{M_i f_{0,i}}{\lambda_i \nu_i} \left[ \int_0^{200} PSD_{g,i}(f) H^2(f) df \right]^{\frac{m}{2}}}{N_w \left[ \int_0^{50} H^m(f) df + \int_{50}^{100} a^m H^m(f) df + \int_{100}^{150} b^m H^m(f) df + \int_{150}^{200} c^m H^m(f) df \right]} \right\}^{\frac{1}{m}}$$

(vi) recalculating the acceleration forces $G_u$, and then (vii) testing the product using the selected variables to validate the required performance lifetime for the product when no test failures are observed over all of the $N_w$ test sweeps.

17 Claims, 4 Drawing Sheets

METHOD TO SPECIFY SINUSOIDAL VIBRATION TESTS FOR PRODUCT DURABILITY VALIDATION

BACKGROUND OF THE INVENTION

1. Field of the Invention

The present invention relates to a method for validating the operational durability of an electronic product based upon accelerated laboratory sinusoidal vibration tests employing the physics-of-failure and damage correlation.

2. Description of the Prior Art

The vibration loading applied on automotive components during actual operating conditions is the combination of several random processes corresponding to different field driving routes. In order to improve quality and reduce testing time and cost, laboratory tests are usually conducted on products in an accelerated manner. In the automotive industry, accelerated testing using sinusoidal vibration is widely used due to the low equipment cost and the convenience in test set up and monitoring. Product durability is correctly validated by this sinusoidal vibration test provided that this data can be correctly correlated to actual field data.

An objective of the present invention is to develop a testing methodology to determine sinusoidal vibration testing methodologies based on the physics-of-failure and damage equivalence technique such that the vibration damage generated in the laboratory test will be equivalent to the damage induced by random vibration in the field. Based on the field random vibration profiles and the desired product life goal, an equivalent laboratory sinusoidal vibrational testing environment, including the vibration level and test time, is defined. If a product survives this laboratory test environment, it can survive in the field during the desired life time.

SUMMARY OF THE INVENTION

The present invention describes a method for determining the testing profile for accelerated laboratory, sinusoidal vibrational testing of a product, comprising the steps of:

(i) selecting the type and rate for the frequency sweep too be used in the accelerated testing, (ii) developing a simplified composite Power Spectral Density function $PSD_j$, including scaling coefficients, representative of the PSD for random vibration loadings in expected field vibration levels.

(iii) developing the acceleration function $G_T(f)$, corresponding to $PSD_j$ and using the PSD scaling coefficients, for producing on the product the test acceleration forces corresponding to the $PSD_j$ function, (iv) calculating the stress response curve $H(f)$ for the product representative of the transmissibility function from the input acceleration forces to the local vibration stress forces.

(v) calculating the range of acceleration forces $G_u$ required for implementing $G_T(f)$ from the relationship $$G_u = \left\{ \frac{1) \Sigma_i \frac{M_i f_{0,i}}{\lambda_i v_i} \left[ \int_0^{200} PSD_{g,i}(f) H^2(f) df \right]^{\frac{m}{2}} \cdot 11.1 x (\sqrt{2})^m \Gamma\left(\frac{m}{2}+\right)}{N_W \left[ \int_0^{50} H^m(f) df + \int_{50}^{100} a^m H^m(f) df + \int_{100}^{150} b^m H^m(f) df + \int_{150}^{200} c^m H^m(f) df \right]} \right\}^{\frac{1}{m}}$$

and then selecting the number of frequency sweeps $N_w$ based on the capabilities of the testing equipment and the testing time available.

(vi) recalculating the acceleration forces $G_u$ based on the scaling coefficients and the selected value of $N_w$, and then (vii) testing the product using the selected sweep type, sweep rate, $G_u$ acceleration forces and $N_w$ number of frequency sweeps, to validate the required performance lifetime for the product when no test failures are observed over all of the $N_w$ test sweeps.

BRIEF DESCRIPTION OF THE DRAWINGS

Other objects, features and advantages of the invention will be apparent from a study of the written descriptions and the drawings in which.

DEVELOPMENT OF ACCELERATED TESTING ASSUMPTIONS

ESTIMATION OF THE DAMAGE IN FIELD

Fatigue damage under random vibration can be estimated based on Miner's rule:

$$D = \int_0^\infty \frac{n(S_A)}{N(S_A)} dS_A = \Sigma_i \frac{n_i(S_A)}{N_i(S_A)} \qquad 1$$

where $n(S_A)$ is the number of cycles applied at stress amplitude level of $S_A$, and $N(S_A)$ is the mean cycles to failure at the applied stress $S_A$. Usually, the relation between $S_A$ and $N(S_A)$ (the S-N curve) is expressed by the following formula:

$$N = C\, S_A^{-m} \qquad (2)$$

where C and m are material properties for a given temperature, mean stress, and surface condition.

Figure 1:
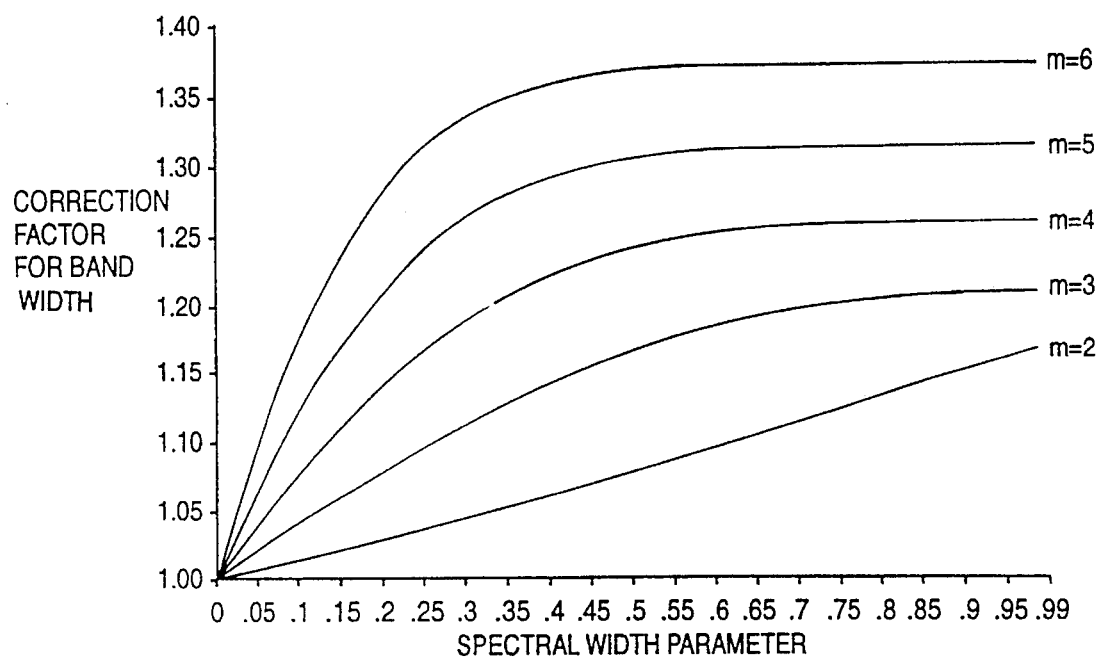
FIG. 1 is a plot showing the Correction Factor for wideband random vibration.

Assuming that the random vibrations produced by each road surface are a stationary Gaussian process or distribution, the total cumulative damage for all field routes can be estimated by the following equation:

$$D_F = \Sigma_i D_i =$$

$$\Sigma_i \frac{3600\, M_i f_{0,i} (\sqrt{2})^m \Gamma\left(\frac{m}{2}+1\right)}{\lambda_i v_i C} \left\{ \int_{f_{min}}^{f_{max}} PSD_{g,i}(f) H^2(f) df \right\}^{\frac{m}{2}} \qquad (3)$$

where $M_i$ is the operating miles for ith road surface; $\Gamma(.)$ is the Gamma function: $\lambda_i$ is the correction factor for bandwidth as shown in FIG. 1: $v_i$ is the driving speed (in MPH) for measuring Power Spectral Density (PSD): and $PSD_{g,i}(f)$ is the power spectral density (PSD) function of the field input acceleration. $H(f)$ is the stress response function, which is the transmissibility from the input acceleration to the local stress that can be obtained from dynamic stress analysis by using CAE tools; and $f_{min}$ and $f_{max}$ are the lower bound and upper bound of applied frequencies. The boundary is determined so that the values of $PSD_g(f)$ outside of the boundary are less than 0.001 of the peak value. The term $f_{o,i}$ in Equation 3 is the average frequency determined by the following equation:

$$f_{0,i} = \sqrt{\frac{\int_0^\infty f^2 PSD_{g,i}(f) H^2(f) df}{\int_0^\infty PSD_{g,i}(f) H^2(f) df}} \qquad (4)$$

ESTIMATION OF DAMAGE INDUCED IN LABORATORY SINUSOIDAL TESTING

In laboratory testing, logarithmic sweep and linear sweep tests are conventionally conducted at a constant rate. For the logarithmic sweep:

$$\text{Log } f = At - B \qquad (5)$$

where A and B are constants to determine the sweep rate. From Equation 5, it can be determined that:

$$dt = \frac{1}{A \ln 10 f} df \qquad (6)$$

The actual number of cycles for each frequency interval then can be estimated by:

$$\Delta n = f \Delta t = \frac{f}{A \ln 10} \left\{ \log\left(f - \frac{\Delta f}{2}\right) - \log\left(f - \frac{\Delta f}{2}\right) \right\} = \frac{1}{A \ln 10} \Delta f \qquad (7)$$

Writing $\Delta n$ as $n_i(S_A)$ and substituting Equations 2 and 7 into Equation 1 gives the total damage in logarithmic sweep test, $D_T$:

$$D_T = \frac{2 \times N_W}{A \ln 10\, C} \int_{f_{min}}^{f_{max}} G_T^m(f) H^m(f) df \qquad (8)$$

where $G_T(f)$ is the amplitude of the input acceleration in the test, and $N_w$ is the required test life in terms of the number of sinusoidal sweeps (from low to high frequency and back from high to low frequency). For a linear sweep:

$$f = A't - B' \qquad (9)$$

where A' and B' are constants to determine the sweep rate. From Equation 9, it can be determined that:

$$dt = \frac{1}{A'} df \qquad (10)$$

The actual number of cycles for each frequency interval can then be estimated by:

$$\Delta n = f \Delta t = \frac{f}{A'} \Delta f \qquad (11)$$

Therefore the total damage in a linear sweep test can be estimated by:

$$D_T = \frac{2 \times N_W}{A' C} \int_{f_{min}}^{f_{max}} f G_T^m(f) H^m(f) df \qquad (12)$$

As indicated in Equation 7, the logarithmic frequency sweep gives the same number of cycles for a given frequency increment as the linear sweep testing, and is independent of the frequency level. However, for the same frequency increment, the linear sweep gives a large number of cycles at high frequency according to Equation 11.

In reality, the cycles of very large acceleration amplitude (corresponding to low frequency) and those of very small acceleration amplitude (corresponding to high frequency) are fewer than the cycles of the medium acceleration amplitude (according to the central limit theorem). Therefore, a logarithmic frequency sweep is more desirable than a linear frequency sweep in the laboratory testing, because the latter may result in too many cycles in the high frequency range.

The sweep rate should not be so high that the structure cannot build-up the expected response, and the sweep rate should not be so low that the physical effects of the sequence between the large amplitude and the small amplitude is not produced. In one preferred example for an automotive instrument cluster and associated electronic equipment modules, a 10-minute sweep from 5 Hz to 200 Hz is appropriate. For this case, sweeping from 5 Hz to 200 Hz for 10 minutes (f=5 Hz at t=0, and f=200 Hz at t=600) results in the values of the constants A=0.00267 and B=0.7, which gives:

$$\Delta n = f \Delta t = 162.65 \Delta f \qquad (13)$$

Therefore, the total damage in the accelerated laboratory test is calculated as:

$$D_T = \frac{2 \times 162.5 \times N_W}{C} \int_{f_{min}}^{f_{max}} G_T^m(f) H^m(f) df \qquad (14)$$

DAMAGE EQUIVALENCE TECHNIQUE

The previously explained approximations allow the development of a laboratory testing methodology with a defined testing duration so that the damage generated in the laboratory with the defined test duration is the same as that generated in the field for the period of desired product life time. That is:

$$D_F(\text{life time}) = D_T(\text{test durtion}) \qquad (15)$$

Therefore, from Equations 3 and 14, the required laboratory, test levels can be calculated if an appropriate test duration is specified, or the required test duration can be calculated if the appropriate test levels are specified. The number of sinusoidal sweeps $N_w$ becomes:

$$N_W = \frac{11.1 \left(\sqrt{2}\right)^m \Gamma\left(\frac{m}{2}+1\right)}{\int_{f_{min}}^{f_{max}} G_T^m(f) H^m(f) df} \Sigma_i \frac{M_i f_{0,i}}{\lambda_i v_i} \left\{ \int_{f_{min}}^{f_{max}} PSD_{g,i}(f) H^2(f) df \right\}^{\frac{m}{2}} \quad 16$$

Equation 16 shows that the required number of sinusoidal sweeps is dependent on the fatigue properties of the material and the stress response function (that can be determined by finite element analysis). The product lifetime requirement is reflected in the distance traveled by the vehicle (in miles) for each route, $M_i$.

DETERMINATION OF LABORATORY TEST REQUIREMENT

In order to correlate the laboratory, sinusoidal testing to random vibrations observed in the field, a method to specify the durability test specification may be based on the damage equivalence technique, with the field loading measurement used as the input variable. The determination of the laboratory test requirements corresponding to typical field environments and lifetime goals include the determination of sweep type and sweep rate, the shape (or scaling factor) of the laboratory test profile, the number of test sweeps, and the levels of the laboratory test profile. In order to determine these parameters, the typical PSDs as measured in the field should be simplified, and the stress response curve of the product should be calculated.

DESCRIPTION OF THE PREFERRED ACCELERATED TESTING METHOD

Based on the assumptions and theory discussed above, a method for determining the vibration test requirements for accelerated product durability verification may be expressed in the following steps:

(i) Select sweep type and sweep rate

The logarithm frequency sweep gives the same number of cycles for a given frequency increment and is independent of the frequency level. However, for the same frequency increment, the linear sweep gives a large number of cycles of high frequency. In reality, a logarithm frequency sweep is more reasonable than the linear frequency sweep, because the latter may result in too many cycles in the high frequency range. For these reasons, the logarithmic frequency sweep is used in the preferred testing method.

The sweep rate should not be so high that the structure cannot build up the expected response. The sweep rate should not be so low that the effect of the sequence between the large amplitude and the small amplitude does not provide an appropriate distribution of loading. It is believed that a 10-minute sweep from 5 Hz to 200 Hz (A=0.00267) is appropriate, but sweep rates of from 5 minutes to 30 minutes may be used as required for particular accelerated testings. For components subjected to high frequency environments frequencies of up to 2,000 Hz may be required.

(ii) Simplify the field-measured PSDs

Figure 3:
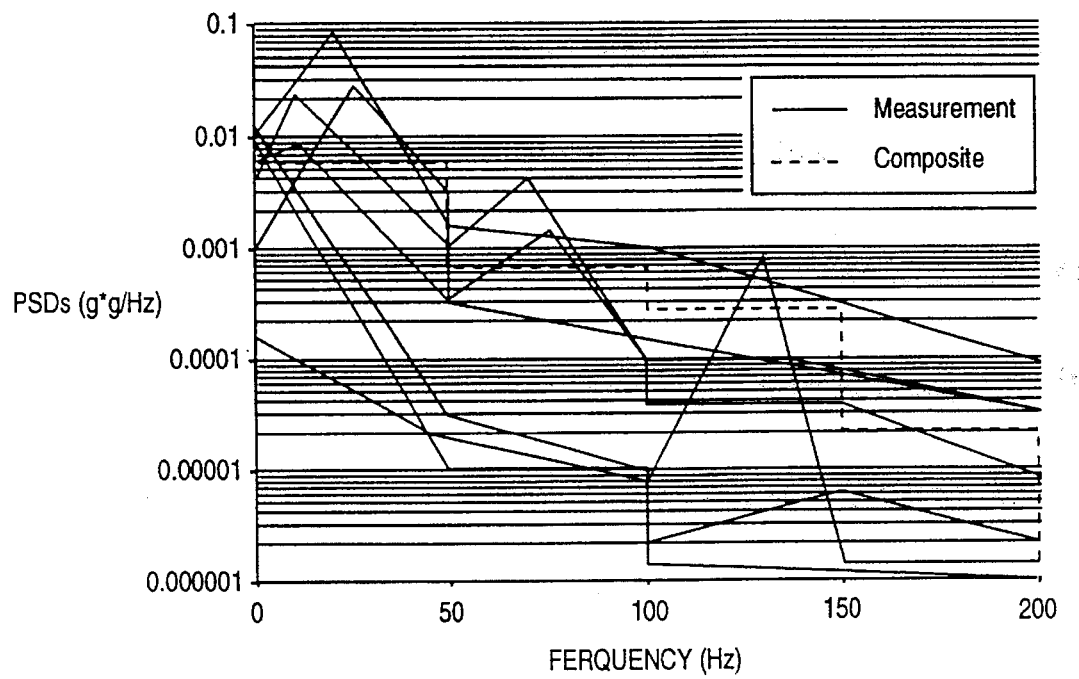
FIG. 3 illustrates an example of the stress-frequency response curve with unit acceleration at the critical point.
Figure 4:
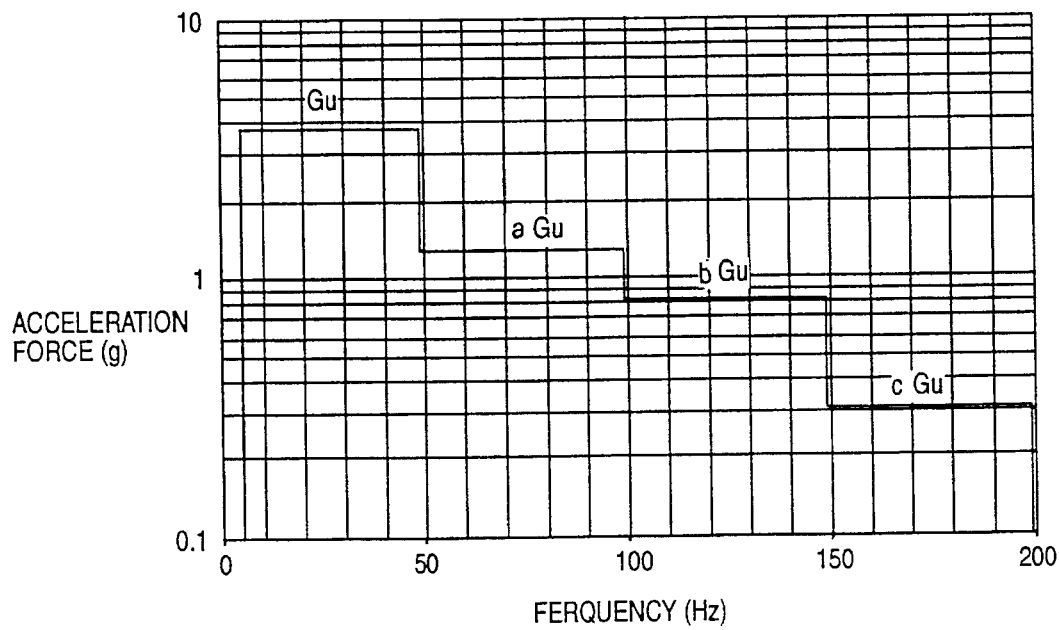
FIG. 4 is a plot of test loading level versus frequency for the laboratory acceleration sweep profile.

The field random vibration loadings are the power spectral density (PSD) curves measured for each road surface typically encountered. The composite PSD curve is illustrated in FIG. 3 as representing the typical vehicle vibration environment at a typical product mounting location. The composite PSD curve is derived from PSD data measured in the field and then simplified into a four-level step function as illustrated by the dashed line in FIG. 3. The frequencies at the stepping point of each level are specified as $f_0=0$, $f_1=50$, $f_2=100$, $f_3=150$, and $f_4=200$ Hz. This assumption set may not be appropriate for simulating vibration for an engine mounted component. The levels of the composite PSD ($PSD_1$, $PSD_2$, $PSD_3$ and $PSD_4$) are determined by the weighted average (energy equivalence) as follows:

$$PSD_j = \frac{\Sigma_i \frac{M_i f_{g,i}}{v_i} \int_{f_{j-1}}^{f_j} PSD_{g,i}(f) df}{(f_j - f_{j-1}) \Sigma_i \frac{M_i f_{g,i}}{v_i}} \quad 17$$

$$j = 1,2,3,4$$

where the average frequency $f_{g,i}$ is calculated according to Equation 4. Therefore, the composite PSD for the representative product mounting location can be expressed as follows:

$$PSD_j = \begin{bmatrix} PSD_1 & 0 < f < 50 \\ a^2 PSD_1 & 50 < f < 100 \\ b^2 PSD_1 & 100 < f < 150 \\ c^2 PSD_1 & 150 < f < 200 \end{bmatrix} \quad 18$$

where $a^2$ is the ratio of $PSD_1$ and $PSD_2$, $b^2$ is the ratio of $PSD_1$ and $PSD_3$, and $c^2$ is the ratio of $PSD_1$ and $PSD_4$. The coefficients $a^2$, $b^2$ and $c^2$ correspond to the relative energy levels of the multiple frequency bands in the composite PSD, as illustrated in FIGS. 3 and 4.

(iii) Determine the shape of the laboratory test profile

The shape of the laboratory test force profile is determined according to the shape of the simplified composite PSD curve. In order to insure that the input energy distribution (in the frequency domain) of the test is similar to what will be encountered in the field, the following step function should be used as the sinusoidal acceleration input (acceleration forces measured in g-force units) because it simulates a step function of PSD expressed in Equation 18:

$$G_T(f) = \begin{bmatrix} G_U & 0 < f < 50 \\ a\,G_U & 50 < f < 100 \\ b\,G_U & 100 < f < 150 \\ c\,G_U & 150 < f < 200 \end{bmatrix} \quad 19$$

where the scaling factor constants a, b, and c are determined based on Equation 18, and $G_u$, is the highest acceleration level of the test profile which also corresponds to the maximum vibrational force exerted on the product being tested. This sinusoidal acceleration input function $G_T(f)$ is illustrated in the frequency domain in FIG. 4.

Therefore, the scaling factor constants for the loading level $G_T(f)$ determine the shape of the laboratory test profile

(iv) Calculate the stress response curve

The stress response curve H(f) of the product is obtained from a dynamic stress analysis by using CAE tools, such as the ABAQUS finite element analysis software tool as sold by Hibbitt, Karlsson and Sorensen. Inc. 1080 Main Street. Pawtucket. R.I. This stress response curve H(f) is the transmissibility function from the input vibration acceleration forces to the local vibration stress. The resulting data file for H(f) is a list of H values for selected frequencies, as is well known in this art area, and will be used in the determination of test loading levels in the next steps.

(v) Specify the number of test sweeps

The number of the sweeps may be specified based on the capability, of testing equipment and the testing time available. When formulating an efficient testing protocol, fewer sweeps are better. However, from an accuracy perspective, as more frequency sweeps are incorporated the test simulates the field acceleration more accurately, because the reduced number of sweeps requires higher acceleration force levels which may cause product failure mechanism shift or which the testing equipment may not be able to generate.

Substituting the stress frequency response curve H(f) as calculated in the previous step,, such as the one illustrated in FIG. 2, into Equation 16, together with Equations 18 and 19, the relationship between the highest vibration acceleration level and the desired number of sweeps can be determined as follows:

$$G_u = \left\{ \frac{11.1 \times (\sqrt{2})^m \Gamma\left(\frac{m}{2}+1\right) \Sigma_i \frac{M_i f_{0,i}}{\lambda_i v_i} \left[\int_0^{200} PSD_{g,i}(f) H^2(f) df\right]^{\frac{m}{2}}}{N_W \left[\int_0^{50} H^m(f) df + \int_{50}^{100} a^m H^m(f) df + \int_{100}^{150} b^m H^m(f) df + \int_{150}^{200} c^m H^m(f) df\right]} \right\}^{\frac{1}{m}}$$ 20

This equation provides solutions for the G(f) acceleration forces as a function of the number of sweeps $N_w$. These relationships can be plotted as illustrated by the $G_u$ line in FIG. 5. The aGu, bGu, and cGu acceleration forces required are also plotted in order to determine the trade off between acceleration forces and testing time required during the tests. For example, the $G_u$ line shows that approximately 4.2 g's of acceleration would be required for 0–50 Hz frequency band, 1.6 g's for the 50–100 Hz frequency band, 0.94 g's for the 100–150 hz frequency band, and 1.9 g's for the 150–200 Hz frequency band. Even if the testing equipment were capable of generating these loads. A larger number of frequency sweeps at lower g-force loading would be preferred because they more closely approximate the g-force loadings actually observed in the field.

A comprehensive judgement then can be made based on testing time available, test machine capability, and concerns over failure mechanism shift. In general, 18 to 36 sweeps are recommended, but as few as 5 and as many as 100 frequency sweeps may be required by the particular testing requirements. In the preferred method, 18 sweeps are deemed the preferred number for $N_w$.

(vi) Specify the loading level

Figure 5:
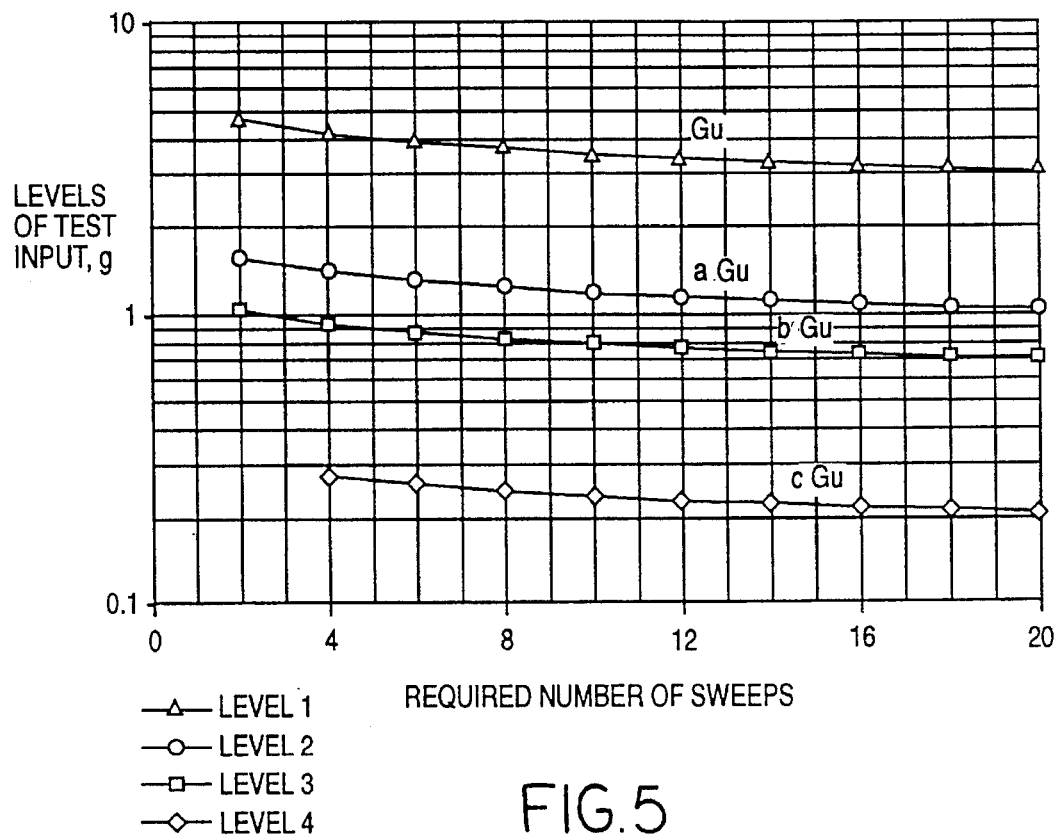
FIG. 5 illustrates an example of the laboratory vibration level versus required test duration for a specific product at a given location within the vehicle.

Once the number of vibration sweeps is determined in step (v) above, the loading level of the vibration test input can then be calculated according to Equations 19 and 20, or observed from the Gu, aGu, bGu and cGu lines as shown in FIG. 5. The laboratory testing equipment is set up for the chosen acceleration levels over the prescribed frequency bands.

(vii) Run the laboratory testing

The laboratory accelerated testing is then performed using the selected sweep type, the selected sweep rate, the shape/scaling factors and the number of sweeps. If no failures are observed during the testing, then the proposed design for the product should not fail in field operation during the expected lifetime of the product. If the product fails before the laboratory testing is complete, then laboratory testing must be extended and additional failures determined for the extended testing duration or enlarged sample testing. A method for determining the additional testing required and the success or failure of the laboratory testing is disclosed in my copending patent application Ser. No. 08/543,418, filed Oct. 16, 1995, and entitled "Method to Reduce Sample Size In Accelerated Reliability Verification Tests", which is incorporated herein by reference.

INSTRUMENT CLUSTER EXAMPLE

In this section, an instrument cluster is used as an example to illustrate the application of the accelerated durability testing process described above. The instrument cluster consists of a plastic box, a Printed Wiring Board (PWB), and several heavy display components with insertion leads. The potential failure mechanism is the fatigue due to vibration at the lower corner of the component insertion leads. The relationship between stress amplitude S and cycles to failure of the lead material is determined from material fatigue testing and is:

$$N = 2.54 \times 10^{19} S_A^{-6.11}$$ 21

The logarithmic frequency sweep is selected and the sweep rate is chosen as a 10-minute sweep from 5 Hz to 200 Hz.

FIG. 3 shows seven PSD curves measured at the instrument panel of a light truck driven on seven road surfaces during a proving ground test. The average driving speed. the required driving distance, and the driving time are listed in Table 1. This proving ground driving test may be considered to be equivalent to customer usage of the light truck for 150,000 miles. Based on the seven PSD curves and the information listed in Table 1, the composite PSD curve is determined according to Equations 17 and 18. The dashed curve in FIG. 3 is the composite PSD curve which will be used to determine the test acceleration level. From the composite PSD curve, the constants a, b, and c that determine the shape of laboratory test profile are calculated as a=0.33, b=0.22, and c=0.06 from Equation 18.

The dynamic vibrational stress analysis was performed by using the finite element method. The stress response curve H(f) at the root of the lead is obtained and plotted in FIG. 2. Substituting the stress response curve and the material property m=6.11 (given by Equation 21) into Equation 20, the relationship between the highest vibration level and the required number of sweep is plotted in FIG. 5.

If $N_w$=18 is selected as a compromise between too few and too many sweeps, the vibration levels are calculated according to Equation 19. The results are summarized in Table 2. Since the testing time for each sweep is 20 minutes, the testing time for each axis is 6 hours (20 minutes times 18 sweeps) and the total testing time is 18 hours for three axis testing.

TABLE 1

Field Road Load Conditions (150,000 Miles Equivalent)

| Road Condition | Driving Speed (MPH) | Driving Distance (Mile) | Driving Time and Percentage (Hour, %) |
|---|---|---|---|
| 1. Power Hop Hill | 27 | 173 | 6.4, 1.38 |
| 2. Silver Creek | 20 | 2074 | 103.7, 22.3 |
| 3. Pot Holes | 12 | 23 | 1.9, 0.4 |
| 4. Cobble Stones (A.D.) | 27 | 1008 | 37.3, 8.0 |
| 5. Undulating Road (A.D.) | 27 | 992 | 6.7, 7.9 |
| 6. Wash Board (A.D.) | 27 | 611 | 22.6, 4.9 |
| 7. Others | 57 | 14559 | 255.4, 55 |
| Total | | 19440 | 464, 100 |

TABLE 2

Laboratory Test Requirement of Instrument Cluster Correlated to Field Damage

| Selection of Number of | Acceleration (g) | Frequency (Hz) | Number Axis | Total sweep | Total Duration |
|---|---|---|---|---|---|
| 18 | 3.3 | 5–50 | 3 | 54 | 18 |
| | 1.1 | 50–100 | | | |
| | 0.7 | 100–150 | | | |
| | 0.2 | 150–200 | | | |

DETERMINATION OF THE GENERIC TEST REQUIREMENT

The laboratory test requirement specified in Table 2 is for a particular product for which the property of the material associated with the potential failure is known, and for which the transmissibility function can be calculated from dynamic finite element analysis. However, generic laboratory test requirements for a given vehicle location may be required when these properties are not readily available or known. In this case, a laboratory testing method must be developed such that the method is independent of transmissibility and material properties. Conservative engineering assumptions may be used to estimate the effects of transmissibility (stress response function) and material property.

The method proposed by the present invention provides a practical approach that is reasonably conservative. The procedures to determine sweep the and sweep rate, the shape of the laboratory test profile, and the number of test sweeps are same as described above. Only the method to determine the level of test input will be modified, as explained below.

The relationship between the highest vibration level and the desired number of sweeps expressed in Equation 20 can also be written as:

$$G_u = \left\{ \frac{11.1 (\sqrt{2})^m \, \Gamma\left(\frac{m}{2}+1\right) PSD_u^{\frac{m}{2}} \Sigma_i \frac{M_i f_{0,i}}{\lambda_i v_i}}{N_w} \right\} \quad (22)$$

Figure 2:
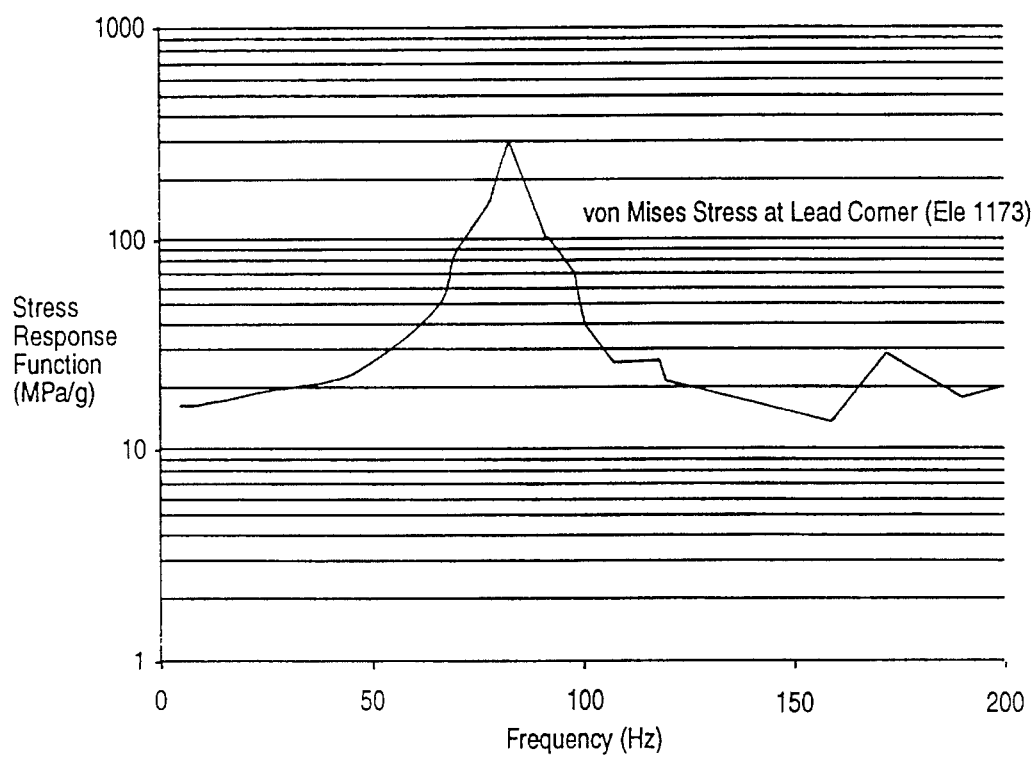
FIG. 2 illustrates an example of PSD curves measured from the field data.

For most products, the transmissibility function has a sharp peak at the natural resonant frequency of the product, such as in FIG. 2. Therefore, the transmissibility function may be approximated with the one degree-of-freedom formula as follows:

$$H(f) = \frac{D}{(2\pi f_n)^2 \sqrt{\left[1 - \left(\frac{f}{f_n}\right)^2\right]^2 - \left[2\zeta\left(\frac{f}{f_n}\right)\right]^2}}$$

where D is a constant indicating the relationship between the local stress and the relative displacement, $f_n$, is the natural resonant frequency of the structure, and z is the damping ratio.

Since the shape of H(f) forms a sharp peak, the value of the integral outside the frequency range containing the natural frequency will be very small in both the numerator and the denominator of Equation 22. Therefore, the effect of the transmissibility on Equation 22 can be estimated by investigating the following integral ratio:

$$\text{Integral Ratio} = \frac{\left[\int_0^{50} H^2(f)df + \int_{50}^{100} a^2 H^2(f)df + \int_{100}^{150} b^2 H^2(f)df + \int_{150}^{200} c^2 H^2(f)df\right]^{\frac{m}{2}}}{\int_5^{50} H^m(f)df + \int_{50}^{100} a^m H^m(f)df + \int_{100}^{150} b^m H^m(f)df + \int_{150}^{200} c^m H^m(f)df} = \frac{\left\{\int_{f_i}^{f_{i+1}} H^2(f)df\right\}^{\frac{m}{2}}}{\int_{f_i}^{f_{i+1}} H^m(f)df} \quad (24)$$

where $f_i$ to $f_{i-1}$ is the frequency range containing the primary frequency.

Figure 6:
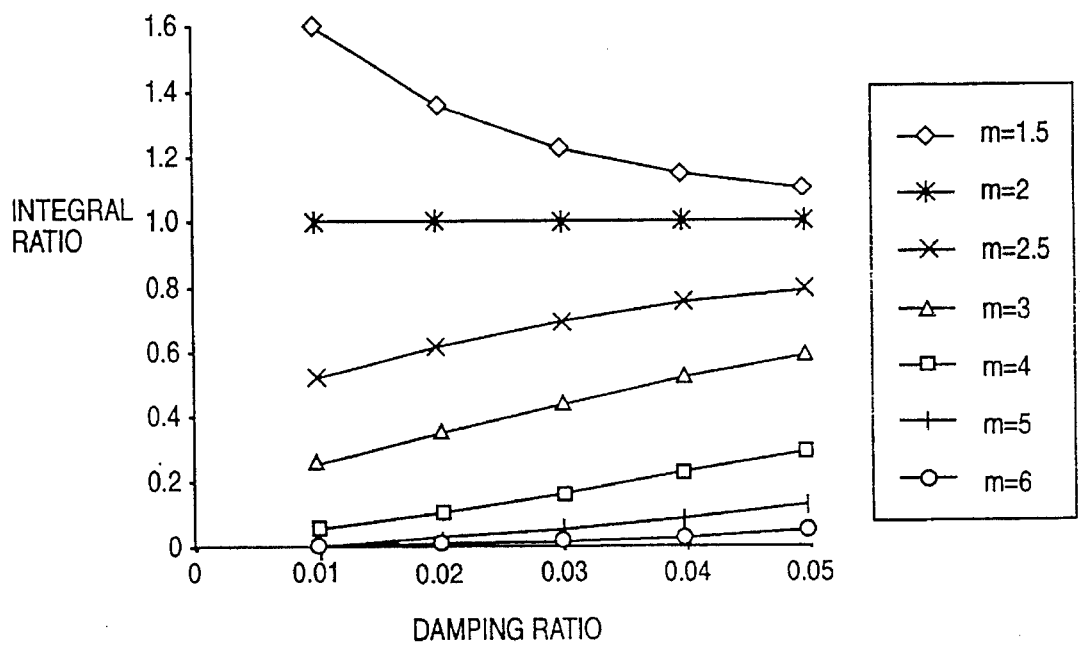
FIG. 6 illustrates the effect of damping ratio on the integral ratio for different materials.
Figure 7:
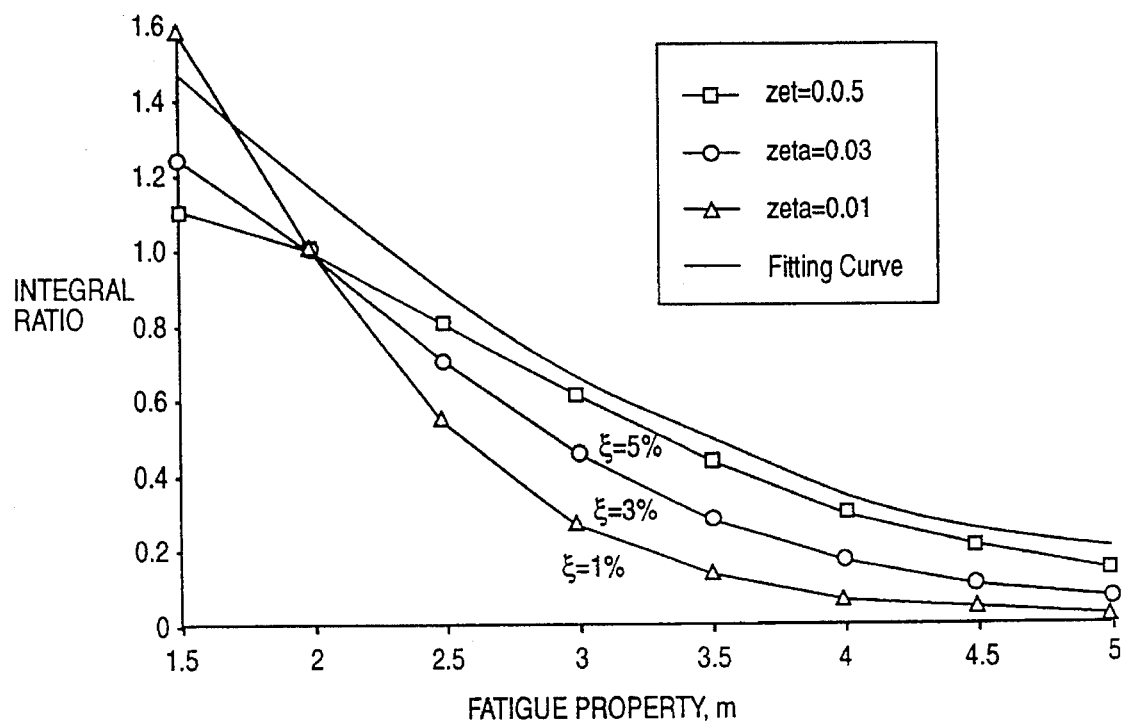
FIG. 7 illustrates the effect of fatigue property on the integral ratio, including the derived fitting curve.

Substituting Equation 23 into Equation 24 gives the value of the integral ratio as a function of damping ratio $\zeta$ and fatigue property m. For most products and structures, the damping ratio is usually between $\zeta=1\%$ and $\zeta=5\%$ and the fatigue property is usually between $m=1.5$ and $m=5$. FIG. 6 shows that the effect of the damping ratio on the integral ratio is not very strong. However, the integral ratio is strongly dependent on the material property m. Since the damping ratio of the products is usually less than 5%, a fitting curve based on $\zeta=5\%$ is obtained as an upper bound, as illustrated in FIG. 7. The equation of the fitting curve is expressed by:

$$\text{Integral Ratio} = 0.09(5.3-m)^2 - 0.18 \quad (25)$$

Therefore, the effect of transmissibility on the upper level of input acceleration in Equation 22 may be estimated as:

$$G_u = \left\{ [(m-5.5)^2 + 2](\sqrt{2})^m \, \Gamma\left(\frac{m}{2}+1\right) \right\}^{\frac{1}{m}} \frac{\left\{ PSD_u^{\frac{m}{2}} \Sigma_i \frac{M_i f_{g,i}}{v_i} \right\}^{\frac{1}{m}}}{N_w^{\frac{1}{m}}} \quad (26)$$

Now, further assume the fatigue property is m=3 (which is the average of value for the most frequently used materials in automotive components), then the following equation for determining the highest acceleration force level for the test input can be developed:

$$G_u = 3.14 \times \sqrt{PSD_u} \left\{ \frac{1}{N_W} \Sigma_i \frac{M_i f_{g,i}}{v_i} \right\}^{\frac{1}{3}} \quad (27)$$

Figure 8:
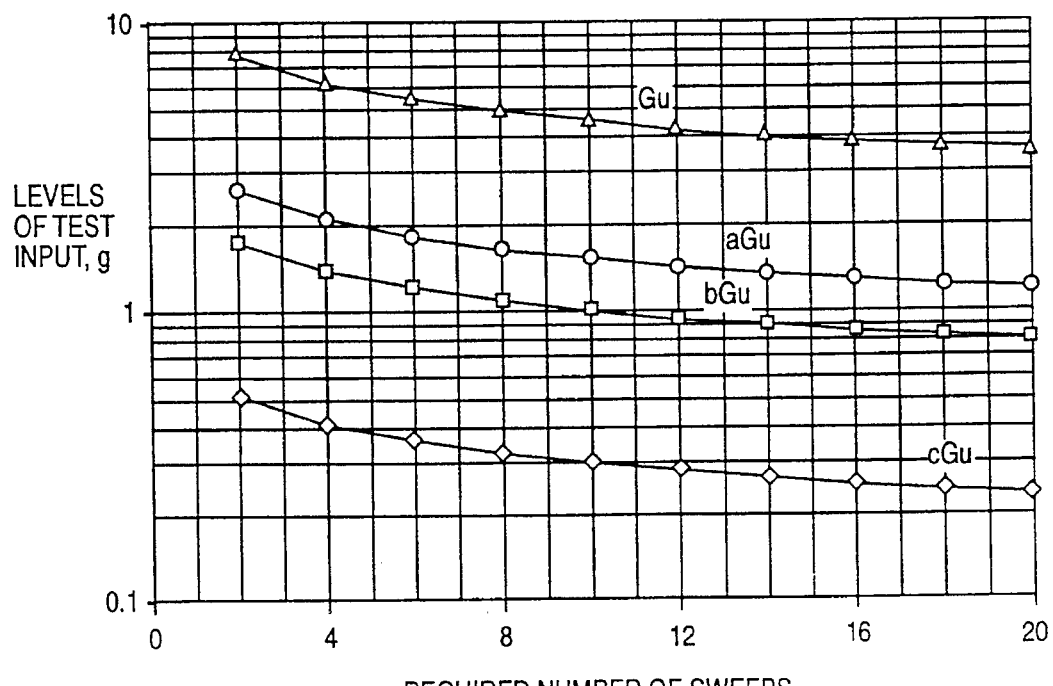
FIG. 8 illustrates the generic laboratory vibration acceleration levels as a function of required test sweeps for a given location within the vehicle.

The conservative test requirement is then determined for any product mounted on the instrument panel. In a similar manner to step (v) above, the relationship between the highest acceleration force level and the required number of sweeps is plotted in FIG. 8. Selecting the number of sweeps $N_w$, 32 18. The vibration levels are calculated according to Equation 27, which is summarized in Table 3. Since the testing time for each sweep is 20 minutes, the total testing time is 18 hours for a three axis test. The results are summarized in Table 3.

As will be apparent, this method uses general engineering assumptions in order to allow Equation 27 to be substituted for Equation 20 in step (v), which in turn allows step (iv) to be omitted if the stated assumptions are valid.

TABLE 3

Laboratory Test Requirement of Products Mounted on Instrument panel

| Selection of Number of | Acceleration (g) | Frequency (Hz) | Number Axis | Total sweep | Total Duration |
|---|---|---|---|---|---|
| 18 | 3.8 | 5–50 | 3 | 54 | 18 |
|    | 1.3 | 50–100 |   |   |    |
|    | 0.8 | 100–150 |   |   |    |
|    | 0.3 | 150–200 |   |   |    |

In summary, the laboratory test requirement to insure product durability is dependent on the geometry of the product and the material associated with the failure. The required vibration level for a given test time or the required test time for a given vibration level can be accurately determined for a product with known geometry, provided that the structural transmissibility can be calculated, and that the material properties are known. A correct vibration specification can be developed based on the damage equivalence technique according to the vehicle miles/speed and the PSD curves measured at the vehicle zone in which the product will be mounted for real customer usage profiles. If the geometry, and material properties are unknown, conservative engineering assumptions may be used for making the accelerated testing generally independent of these functions. Using this method, it may be possible to simulate 150.000 miles of driving in only 18 hours of accelerated laboratory vibration testing.

While the best mode of the method has been described in detail, one skilled in this art will be capable of numerous variations, modifications and adaptations without departing from the spirit and scope of the present invention. It should be understood that the present invention is not limited to the processes, embodiments or examples contained herein, but are limited only by the scope of the following claims.

I claim:

1. A method for determining the testing profile for accelerated laboratory sinusoidal vibrational testing of a product, the method comprising the steps of:

(i) selecting the type and rate for the frequency sweep to be used in the accelerated testing, (ii) developing a simplified composite Power Spectral Density function $PSD_j$, including scaling coefficients, representative of the PSD for random vibration loadings in expected field vibration levels, (iii) developing the acceleration function $G_T(t)$, corresponding to $PSD_j$ and using the PSD scaling coefficients, for producing on the product the test acceleration forces corresponding to the $PSD_j$ function, (iv) calculating the stress response curve H(f) for the product representative of the transmissibility function from the input acceleration forces to the local vibration stress forces, (v) calculating the range of acceleration forces $G_u$ required for implementing $G_T(f)$ from the relationship $$G_u = \left\{ \frac{11.1 x (\sqrt{2})^m \, \Gamma\left(\frac{m}{2}+1\right) \Sigma_i \frac{M_i f_{0,i}}{\lambda_i v_i} \left[ \int_0^{200} PSD_{g,i}(f) H^2(f) df \right]^{\frac{m}{2}}}{N_W \left[ \int_0^{50} H^m(f) df + \int_{50}^{100} a^m H^m(f) df + \int_{100}^{150} b^m H^m(f) df + \int_{150}^{200} c^m H^m(f) df \right]} \right\}^{\frac{1}{m}}$$

and then selecting the number of frequency sweeps $N_w$, based on the capabilities of the testing equipment and the testing time available, (vi) recalculating the acceleration forces $G_u$ based on the scaling coefficients and the selected value of $N_w$, and then (vii) testing the product using the selected sweep type, sweep rate, $G_u$ acceleration forces and $N_w$ frequency sweeps, to validate the required performance lifetime for the product when no test failures are observed over all of the $N_w$ test sweeps.

2. The accelerated testing method as described in claim 1, further comprising the step of:

(viii) redesigning the product to eliminate the root cause of failures observed in the $N_w$ test sweeps.

3. The accelerated testing method as described in claim 1, further comprising the step of:

(ix) testing an enlarged sample size of the product samples for $N_w$ test sweeps after the failure of the first product test to determine if the failure was statistically significant.

4. The accelerated testing method as described in claim 1, wherein step (i) includes the substep:

(i1) selecting a logarithmic type sweep.

5. The accelerated testing method as described in claim 1, wherein step (i) includes the substep:

(i2) selecting a sweep rate of approximately 10 minutes from frequencies of approximately 5 Hz to 200 Hz.

6. The accelerated testing method as described in claim 1, wherein step (ii) includes the substeps of selecting a PSD including four spectral bandwidths such that $$PSD_j = \frac{\sum_i \frac{M_i f_{g,i}}{v_i} \int_{f_{j+1}}^{f_j} PSD_{g,i}(f) df}{(f_j - f_{j+1}) \sum_i \frac{M_i f_{g,i}}{v_i}}$$

$j = 1,2,3,4$ which is then simplified to $$PSD_j = \begin{bmatrix} PSD_1 & 0 < f < f_1 \\ a^2 PSD_1 & f_1 < f < f_2 \\ b^2 PSD_1 & f_2 < f < f_3 \\ c^2 PSD_1 & f_3 < f < f_4 \end{bmatrix}$$

wherein the scaling coefficients are a, b and c.

7. The accelerated testing method as described in claim 6, wherein step (ii) includes the substeps of selecting $f_1$ as approximately 50 Hz, selecting $f_2$ as approximately 100 Hz, selecting $f_3$ as approximately 150 Hz, and selecting $f_4$ as approximately 200 Hz.

8. The accelerated testing method as described in claim 7, wherein step (iii) includes the substep of developing the acceleration function $G_T(f)$ to correlate with the frequencies $f_1$, $f_2$, $f_3$ and $f_4$, as well as the scaling coefficients a, b, and c.

9. The accelerated testing method as described in claim 1, wherein step (iii) includes the substep of defining $G_T(f)$ as $$G_T(f) = \begin{bmatrix} G_U & 0 < f < f_1 \\ a\, G_U & f_1 < f < f_2 \\ b\, G_U & f_2 < f < f_3 \\ c\, G_U & f_3 < f < f_4 \end{bmatrix}$$

10. The accelerated testing method as described in claim 1, wherein step (iv) includes the substep of selecting $N_w$ from the range of approximately 12 to 20.

11. The accelerated testing method as described in claim 10, wherein step (iv) includes the substep of selecting $N_w$ as approximately 18.

12. A method for determining the testing profile for accelerated laboratory sinusoidal vibrational testing of a product, the method comprising the steps of:

(i) selecting a logarithmic type frequency sweep covering the range of from approximately 5 Hz to 200 Hz in approximately 10 minutes, (ii) developing a simplified composite Power Spectral Density function $PSD_j$, including scaling coefficients a, b, c and d, representative of the PSD for random vibration loadings in expected field vibration levels in the frequency bands defined by approximately 0 Hz, 50 Hz, 100 Hz, 150 Hz and 200 Hz.

(iii) developing the acceleration function $G_T(f)$, corresponding to $PSD_j$ and using the PSD scaling coefficients, for producing on the product the test acceleration forces corresponding to the $PSD_j$ function, (iv) calculating the stress response curve H(f) for the product representative of the transmissibility function from the input acceleration forces to the local vibration stress forces, (v) selecting the number of frequency sweeps equal to approximately 18 and then calculating the acceleration forces $G_u$ required for implementing $G_T(f)$ from the relationship $$G_u = \left\{ \frac{\left( 11.1 \times (\sqrt[m]{2}) \right)^m \Gamma\left(\frac{m}{2} + 1\right) \sum_i \frac{M_i f_{0,i}}{\lambda_i v_i} \left[ \int_0^{200} PSD_{g,i}(f) H^2(f) df \right]^{\frac{m}{2}}}{N_W \left[ \int_0^{50} H^m(f) df + \int_{50}^{100} a^m H^m(f) df + \int_{100}^{150} b^m H^m(f) df + \int_{150}^{200} c^m H^m(f) df \right]} \right\}^{\frac{1}{m}}$$

(vi) testing the product using the selected sweep type, sweep rate, $G_u$ acceleration forces and $N_w$ number of frequency sweeps, to validate the required performance lifetime for the product when no test failures are observed over all of the $N_w$ test sweeps.

13. The accelerated testing method as described in claim 12, further comprising the step of:

(vii) redesigning the product to eliminate the root cause of failures observed in the $N_w$ test sweeps.

14. The accelerated testing method as described in claim 13, further comprising the step of:

(viii) testing an enlarged sample size of the product samples for $N_W$ test sweeps after the failure of the first product test to determine if the failure was statistically significant.

15. A method for determining the testing profile for accelerated laboratory sinusoidal vibrational testing of a product, the method comprising the steps of:

(i) selecting the type and rate for the frequency sweep too be used in the accelerated testing, (ii) developing a simplified composite Power Spectral Density function $PSD_j$, including scaling coefficients, representative of the PSD for random vibration loadings in expected field vibration levels, (iii) developing the acceleration function $G_T(f)$, corresponding to $PSD_j$ and using the PSD scaling coefficients, for producing on the product the test acceleration forces corresponding to the $PSD_j$ function, (iv) calculating the range of acceleration forces $G_u$ required for implementing $G_T(f)$ from the relationship $$G_u = 3.14 \times \sqrt{PSD_u} \left\{ \frac{1}{N_W} \sum_i \frac{M_i f_{g,i}}{v_i} \right\}^{\frac{1}{3}}$$

and then selecting the number of frequency sweeps $N_w$ based on the capabilities of the testing equipment and the testing time available, (v) recalculating the acceleration forces $G_u$ based on the scaling coefficients and the selected value of $N_w$, and then (vi) testing the product using the selected sweep type, sweep rate, $G_u$ acceleration forces and $N_w$ number of frequency sweeps, to validate the required performance lifetime for the product when no test failures are observed over all of the $N_w$ test sweeps.

16. The accelerated testing method as described in claim 15, further comprising the step of:

(vii) redesigning the product to eliminate the root cause of failures observed in the $N_w$ test sweeps.

17. The accelerated testing method as described in claim 16, further comprising the step of:

(viii) testing an enlarged sample size of the product samples for $N_w$ test sweeps after the failure of the first product test to determine if the failure was statistically significant.

* * * * *